(12) United States Patent
Ruland et al.

(10) Patent No.: US 10,165,530 B2
(45) Date of Patent: Dec. 25, 2018

(54) VERIFICATION OF TIME INFORMATION TRANSMITTED BY TIME SIGNALS OR TIME TELEGRAMS

(71) Applicant: Christoph Ruland, Siegen (DE)

(72) Inventors: Christoph Ruland, Siegen (DE); Matthias Schneider, Wilnsdorf (DE)

(73) Assignee: Christoph Ruland, Siegen (DE)

( * ) Notice: Subject to any disclaimer, the term of this patent is extended or adjusted under 35 U.S.C. 154(b) by 191 days.

(21) Appl. No.: 15/077,857

(22) Filed: Mar. 22, 2016

(65) Prior Publication Data

US 2017/0280402 A1 Sep. 28, 2017

(51) Int. Cl.
*H04L 29/06* (2006.01)
*H04W 56/00* (2009.01)

(52) U.S. Cl.
CPC ....... *H04W 56/001* (2013.01); *H04L 63/1475* (2013.01)

(58) Field of Classification Search
CPC .. H04W 56/001; H04W 64/00; H04L 63/1475
See application file for complete search history.

(56) References Cited

U.S. PATENT DOCUMENTS

| | | | |
|---|---|---|---|
| 5,077,706 A | 12/1991 | Wolfgang | |
| 5,945,949 A * | 8/1999 | Yun | G01S 5/0009 342/457 |
| 7,039,421 B2 * | 5/2006 | Couronne | G01C 21/206 342/386 |
| 7,423,977 B1 * | 9/2008 | Joshi | H04J 3/0682 370/231 |
| 7,672,283 B1 * | 3/2010 | Chang | H04W 12/12 370/338 |
| 7,823,446 B2 * | 11/2010 | Nilsson | G01F 23/284 73/290 R |
| 7,869,463 B2 * | 1/2011 | Shiizaki | H04L 47/283 370/229 |
| 7,885,188 B2 * | 2/2011 | Joshi | H04J 3/0682 370/231 |
| 7,978,690 B2 * | 7/2011 | Abel | H04L 49/552 370/360 |
| 8,290,484 B2 * | 10/2012 | Calmettes | H04B 7/18513 370/316 |

(Continued)

OTHER PUBLICATIONS

EP 3001592, European Search Report, dated May 6, 2016, 7 pages.

*Primary Examiner* — Eric Nowlin
(74) *Attorney, Agent, or Firm* — Cesari & Reed, LLP; R. Michael Reed

(57) ABSTRACT

A method is proposed for verification of time data from a time signal modulated on a continuous carrier signal with steps to receive a first time signal with a first reference time, to receive a second time signal with a second reference time, which follows the first reference time in time, for calculation of the target time interval lying between the reference times from the time data contained in the received time signal, to determine a time interval and determine a reference time interval, using counting of periods of the continuous carrier signal within the time interval, for comparison of the target time interval with the reference time interval and to send an error signal, if the deviation determined by the comparison surpasses a stipulated tolerance value.

20 Claims, 3 Drawing Sheets

(56) References Cited

U.S. PATENT DOCUMENTS

| | | | | |
|---|---|---|---|---|
| 8,515,454 B2* | 8/2013 | Shepherd | G01S 5/14 | 342/118 |
| 8,774,621 B2* | 7/2014 | Mukai | H04B 10/07 | 370/230 |
| 8,818,424 B2* | 8/2014 | Emadzadeh | G01S 5/0242 | 342/357.2 |
| 8,837,316 B2* | 9/2014 | Zhang | H04W 24/00 | 370/252 |
| 8,842,699 B2* | 9/2014 | Shiizaki | H04L 47/283 | 370/229 |
| 8,972,622 B2* | 3/2015 | Carlson | H04L 41/0654 | 370/248 |
| 9,015,362 B2* | 4/2015 | Carlson | H04L 41/0654 | 370/248 |
| 9,295,021 B2* | 3/2016 | Hedley | G01S 5/0205 | |
| 9,357,354 B2* | 5/2016 | Palanki | H04W 4/027 | |
| 9,429,639 B2* | 8/2016 | Bartone | G01S 1/042 | |
| 9,578,459 B2* | 2/2017 | Do | H04W 4/023 | |
| 9,686,649 B2* | 6/2017 | Weizman | H04W 4/023 | |
| 9,686,768 B2* | 6/2017 | Palanki | H04W 4/027 | |
| 9,756,598 B2* | 9/2017 | Prechner | G01S 5/0236 | |
| 9,781,560 B2* | 10/2017 | Kim | H04W 4/023 | |
| 9,794,906 B1* | 10/2017 | Aldana | H04W 64/00 | |
| 9,801,019 B2* | 10/2017 | Nallampatti Ekambaram | H04W 4/023 | |
| 9,866,351 B2* | 1/2018 | Sazawa | H04L 1/1819 | |
| 9,907,044 B2* | 2/2018 | Zhang | H04W 64/00 | |
| 2004/0012524 A1* | 1/2004 | Couronne | G01C 21/206 | 342/387 |
| 2004/0258097 A1 | 12/2004 | Johann | | |
| 2005/0116856 A1 | 6/2005 | Haefner | | |
| 2005/0147080 A1 | 7/2005 | Haefner | | |
| 2005/0175039 A1 | 8/2005 | Haefner | | |
| 2005/0202796 A1 | 9/2005 | Haefner | | |
| 2005/0260958 A1 | 11/2005 | Haefner | | |
| 2006/0129864 A1 | 7/2006 | Rigobert | | |
| 2008/0105048 A1* | 5/2008 | Nilsson | G01F 23/284 | 73/290 V |
| 2008/0137689 A1* | 6/2008 | Shiizaki | H04L 1/1887 | 370/498 |
| 2008/0147784 A1* | 6/2008 | Imai | G06F 17/30899 | 709/203 |
| 2008/0247411 A1* | 10/2008 | Abel | H04L 49/101 | 370/419 |
| 2009/0075674 A1* | 3/2009 | Qahwash | H04W 64/00 | 455/456.2 |
| 2010/0061236 A1* | 3/2010 | Joshi | H04J 3/0682 | 370/231 |
| 2010/0246602 A1* | 9/2010 | Barreto | H04L 49/90 | 370/466 |
| 2011/0078530 A1* | 3/2011 | Shiizaki | H04L 1/1887 | 714/749 |
| 2011/0207398 A1* | 8/2011 | Calmettes | H04B 7/18513 | 455/12.1 |
| 2011/0273334 A1* | 11/2011 | Karr | G01S 13/825 | 342/378 |
| 2011/0286505 A1* | 11/2011 | Hedley | G01S 5/0205 | 375/224 |
| 2012/0017121 A1* | 1/2012 | Carlson | H04L 41/0654 | 714/43 |
| 2012/0083278 A1* | 4/2012 | Kazmi | H04W 36/06 | 455/440 |
| 2012/0221748 A1* | 8/2012 | Carlson | H04L 41/0654 | 710/18 |
| 2012/0300859 A1* | 11/2012 | Chapman | H04J 3/0667 | 375/257 |
| 2013/0045010 A1* | 2/2013 | Mukai | H04B 10/07 | 398/52 |
| 2013/0170342 A1* | 7/2013 | Alnuem | H04L 47/283 | 370/230 |
| 2013/0293421 A1* | 11/2013 | Bartone | G01S 1/042 | 342/386 |
| 2013/0336131 A1* | 12/2013 | Zhang | H04W 24/00 | 370/252 |
| 2014/0187257 A1* | 7/2014 | Emadzadeh | G01S 5/0242 | 455/456.1 |
| 2014/0187259 A1* | 7/2014 | Kakani | H04W 64/00 | 455/456.1 |
| 2014/0253389 A1* | 9/2014 | Beauregard | G01S 5/02 | 342/458 |
| 2014/0269391 A1* | 9/2014 | Hansen | H04W 64/003 | 370/252 |
| 2015/0005016 A1* | 1/2015 | Palanki | H04W 4/027 | 455/456.6 |
| 2015/0198696 A1* | 7/2015 | Liu | H04W 64/00 | 370/329 |
| 2015/0349930 A1* | 12/2015 | Sazawa | H04L 43/0864 | 370/254 |
| 2016/0021149 A1* | 1/2016 | Maistri | H04L 65/403 | 348/14.08 |
| 2016/0037511 A1* | 2/2016 | Vincze | H04B 7/024 | 370/329 |
| 2016/0081054 A1* | 3/2016 | Zhang | H04W 64/00 | 370/252 |
| 2016/0094462 A1* | 3/2016 | Heitz | H04W 80/06 | 370/231 |
| 2016/0127036 A1* | 5/2016 | Sohn | G04F 5/00 | 398/20 |
| 2016/0156419 A1* | 6/2016 | Druml | H04W 4/023 | 398/40 |
| 2016/0156420 A1* | 6/2016 | Druml | H04B 10/1149 | 398/40 |
| 2016/0198429 A1* | 7/2016 | Prechner | G01S 5/0236 | 455/456.1 |
| 2016/0219550 A1* | 7/2016 | Palanki | H04W 4/027 | |
| 2016/0269860 A1* | 9/2016 | Weizman | H04W 4/023 | |
| 2016/0277890 A1* | 9/2016 | Nallampatti Ekambaram | H04W 4/023 | |
| 2016/0360362 A1* | 12/2016 | Do | H04W 4/023 | |
| 2017/0006422 A1* | 1/2017 | Kim | G01S 11/16 | |
| 2017/0085420 A1* | 3/2017 | Singh | H04L 41/0803 | |
| 2017/0118735 A1* | 4/2017 | Ruland | H04L 27/14 | |
| 2017/0134271 A1* | 5/2017 | Kohiga | H04L 45/70 | |
| 2017/0227643 A1* | 8/2017 | Nagai | G01S 17/36 | |
| 2017/0245193 A1* | 8/2017 | Zhang | H04L 5/0055 | |
| 2017/0257885 A1* | 9/2017 | Zhang | H04L 5/0055 | |
| 2017/0261591 A1* | 9/2017 | Zhang | G01S 5/0268 | |
| 2017/0266144 A1* | 9/2017 | Venn-Watson | A61K 31/20 | |
| 2017/0272911 A1* | 9/2017 | Agrawal | H04W 4/027 | |
| 2017/0289001 A1* | 10/2017 | White | H04L 69/16 | |
| 2017/0289041 A1* | 10/2017 | Li | H04L 69/16 | |
| 2017/0289946 A1* | 10/2017 | Aldana | H04W 64/00 | |
| 2017/0324642 A1* | 11/2017 | Ertugay | H04L 5/0055 | |
| 2017/0324668 A1* | 11/2017 | Ertugay | H04L 47/25 | |
| 2017/0374639 A1* | 12/2017 | Aldana | H04W 64/00 | |
| 2018/0007511 A1* | 1/2018 | Nallampatti Ekambaram | H04W 4/046 | |
| 2018/0011162 A1* | 1/2018 | Bovard | G01S 5/12 | |
| 2018/0014270 A1* | 1/2018 | Kakani | G01S 11/02 | |
| 2018/0098303 A1* | 4/2018 | Zhang | H04W 24/00 | |
| 2018/0139629 A1* | 5/2018 | Chakrabarti | H04W 24/02 | |
| 2018/0143285 A1* | 5/2018 | Sen | G01S 5/021 | |

\* cited by examiner

VERIFICATION OF TIME INFORMATION TRANSMITTED BY TIME SIGNALS OR TIME TELEGRAMS

FIELD

The present disclosure concerns wired or wireless transmission of time signals and time telegrams and especially a method for verification of time data from time signals and time telegrams modulated onto a continuous carrier signal and a device for execution of this method.

BACKGROUND

Automatic adjustment of freely running clocks by line-transmitted or wireless time information is well known from the prior art. Time data, which are modulated onto a continuous carrier signal with definable allocation of the reference time, is referred to subsequently as time information.

Known examples of such time information are the time signals that have already been broadcast for several decades, which fill up a stipulated time grid with variable and modulated symbols. The time reference of the transmitted time information is given by the time grid. Examples are DCF77 in Germany, MSF in Great Britain and WWV, WWVH, WWVB in the USA. Details concerning these are provided in the following publications:

A. Bauch, P. Hetzel, D. Piester, "Time and Frequency Dissemination with DCF77: From 1959 to 2009 and beyond" *PTB-Mitteilungen, Special Issue* Vol. 119, No. 3, pp-3-26, available at:
http://www.ptb.de/cms/fileadmin/internet/publikationen/pt-b_mitteilungen/mitt2009/Heft3/PTB-Mitteilungen_2009_Heft_3_en.pdf (Jan. 28, 2016)

Piester, D., Bauch, A., Becker, J., & Hoppmann, A.: "Time and Frequency Broadcast with DCF77", *Proc.* $43^{rd}$ *Precise Annual Time and Time Interval (PTTI) Systems and Applications Meetings* (pp. 185-196), available at:
https://www.ptb.de/cms/fileadmin/internet/fachabteilungen/abteilung_4/4.4_zeit_und_frequenz/pdf/2012_Piester_ProcPTTI2011.pdf (Dec. 22, 2015)

"NPL Time & Frequency Services—MSF 60 kHz Time and Date Code", available at: http://www.npl.co.uk/upload/pdf/MSF_Time_Date_Code.pdf (Nov. 24, 2015)

"NIST Time and Frequency Radio Stations: WWV, WWVH, and WWVB", *NIST Special Publication* 250-67, available at: http://tfnist.gov/general/pdf/1969.pdf (Nov. 24, 2015)

J. Lowe: "Enhanced WWVB Broadcast Format, Time and Frequency Services", *National Institute of Standards and Technology, Revision* 1.01, Nov. 6, 2013, available at: http://www.nist.gov/pml/div688/grp40/upload/NIST-Enhanced-WWVB-Broadcast-Format-1_01-2013-11-06.pdf (Nov. 18, 2015)

J. Lowe et alt.: "New Improved System for WWVB Broadcast", $43^{rd}$ *Annual Precise Time and Time Interval (PTTI) Systems and Applications Meeting*, available at: http://129.6.13.54/pml/div688/grp40/upload/Bin-2591.pdf (Nov. 18, 2015)

Further examples for time information broadcasting are multiple source global navigation satellite systems such as the American Global Positioning Service (GPS), Russian GLONASS, and European Galileo. Details about coding and formats of GPS messages are described in:

"Global Positioning System Standard Positioning Service Signal Specification, $2^{nd}$ Edition, 1995, available under: http://www.gps.gov/technical (January 2016)

One of the problems associated with GPS is GPS spoofing in which false global positioning and time signals are broadcast and overpower authentic ones in a navigation system. Similar attacks of broadcasting false time signal by overpowering the authentic time signal in the vicinity of the time signal receiver under attack can be possible also in other wireless time information broadcasting systems.

Another known example for time information broadcasting are the time telegrams transmitted in packet oriented mode, which are used, among other things, for synchronization of receivers in ripple control technology during operation of electrical grids. Ripple control technology permits network operators to control consumers and/or supply systems. For example, the network operator can selectively influence decentralized supply systems, such as solar, wind and hydroelectric power systems, by ripple control telegrams for purposes of load curve control. Ripple control telegrams can be line-transmitted via communication networks, the power grid or wirelessly via radio. Wirelessly transmitted ripple control telegrams are referred to as radio ripple control telegrams. Europaeische Funk-Rundsteuerung GmbH [European Radio Ripple Control] makes such a wireless transmission channel available via a long-wave transmitter. In addition to the radio ripple control telegrams, time telegrams for time synchronization of receivers are also broadcast via this transmitter. Document U.S. Pat. No. 7,995,963 B2 is referred to for additional details, which discloses a radio ripple control system for controlling a number of decentralized customer terminal devices as a function of customer initiated transmission requests by means of central long-wave transmitters.

SUMMARY

However, the problem, that unrecognized modifications are possible on wired and wireless transmission links, remains with the known methods for extracting time information from time signals and time telegrams. For example, so-called man-in-the-middle attacks appear to be promising relative to the known methods, in which manipulated broadcast time signals or time telegrams are broadcast in the vicinity of the receiver being attacked with comparatively higher local electromagnetic field strength. So-called replay attacks of protected time information appear also to be promising relative to the known methods, in which already broadcast time signals or telegrams are received and broadcast again in the vicinity of the receiver being attacked with comparatively higher local electromagnetic field strength.

A solution in this respect is offered by the present method for verification of time information from a time signal or time telegram modulated on a continuous carrier signal, a device for providing a remotely synchronized verified time base and an electronic control system as claimed in the respective independent claims. Advantageous embodiments and modifications are stated in the dependent claims.

As a basis, a method is proposed for verification of time information from a time signal or time telegram modulated on a continuous carrier signal with steps for receiving a first time signal defining a first reference time, for receiving a second time signal or time telegram defining a second reference time, which follows the first reference time, for calculation of the target time interval lying between the time information contained in the time data of the received first and second time signal or time telegram, for determination of the reference time interval by counting of periods of the received signal within the actual time interval between the first and second reference time and to produce an error signal if the deviation determined by the comparison exceeds a stipulated tolerance value.

One advantage of this method can be seen in the fact that verification of the received time information is possible from the received signal and no additional time base is required.

In a first alternative of an embodiment of the basic method, for verification of the time information from time signals transmitted in a fixed time grid used for determination of the reference time interval, the periods of the received signal are counted in the time interval between the reference times defined by time signals.

In a second alternative of an embodiment of the basic method, to verify the time information from time telegrams transmitted in packet oriented mode in a loose time grid used for determination of the reference time interval, the periods of the received signal are counted within the time interval between the first and second reference time.

In a third alternative of an embodiment of the basic method, to verify the time information from time telegrams transmitted in packet oriented mode in a loose time grid used for determination of the reference time interval, the periods of the received signal are counted in the time interval between the received time telegrams, and the reference time interval is obtained by the addition of the packet transmission time to the time, which is determined by the periods counted in the time interval between the received time telegrams.

In one embodiment of the previous third alternative, the packet transmission time is also determined by counting the periods of the received signal during transmission of a time telegram.

In one embodiment of the previous third alternative, a stipulated value is added as packet transmission time.

In one independent embodiment of the preceding three alternatives, during counting of the periods of a frequency modulated continuous carrier signal, the counted periods are weighted with the time of the periods, which vary by frequency modulation. For example, a logical 0 is assigned to a first frequency and a logical 1 is assigned to a second frequency. If a logical 0 is received this implies that the respective periods of the received signal are counted and then multiplied with the time period that corresponds to the first frequency. Likewise, if a logical 1 is received this implies that the respective periods of the received signal are counted and then multiplied with the time period that corresponds to the second frequency.

In one embodiment of the previous methods, the variation of the time of the periods of the frequency modulated signal is established according to data derived by demodulation.

An advantage of the embodiment of all three alternatives can be seen in the fact that verification itself is still possible if the transmission quality still permits the periods of the received signal to be recognized, but the time data cannot be decoded correctly.

One embodiment of all alternatives supports the case, where the received signal contains more than one time information. In this case the receiver recovers two time data, which can be verified independently. WWV, WWVH and WWVB are examples for modulated signals, which contain the time information twice.

One embodiment of all alternatives supports the case, where the received signal contains multiple time data in multiple time signals or time telegrams from different transmitters. GPS is one example, where CDMA is used for the transmission of multiple satellite signals on the same carrier frequency. In this case, the receiver recovers multiple time data. The number of multiple time data is variable. For example, the variable number depends on the number of satellites with LOS (Line of Sight).

In one embodiment the receiver of time signals or time telegrams recovers the continuous carrier signal used by the transmitter for the transmission of the time signal or time telegram. This recovery can be performed for all types of modulation techniques and the case, that multiple time signals or time telegrams are received, which are modulated on the same or different continuous carrier signals, e.g. as described in [0019] and [0020]. Nevertheless, the technology of recovery is depending on the type of modulation and transmission technique.

In one embodiment of the preceding method the receiver outputs recovered multiple carrier signals or multiple modulated signals together with multiple time data. The carriers were used for modulation by time data, and the modulated signals are the received modulated version of the time data. The different recovered carrier signals or modulated signals may differ by phase and by frequency in the range of tolerance of the specified continuous carrier frequency. The different time data may not be synchronous. Each of the time data is verified by the method described before as basis method.

In one embodiment of the previous method multiple time data, where each of the time data has been verified successful by the basis method, can be used for calculation of a more exact actual time and position. If necessary other data received from the satellites can be used additionally as input for this calculation. The congregation and processing of multiple time data are executed by a time synchronization module resulting in the verified time information.

The verified time information calculated by the time synchronization module can be used instead of the time information of a first time signal or time telegram to calculate the target time interval as described in [0009].

A device is also proposed for providing a remotely synchronized verified time base, having receiver modules to receive a modulated time signals, or time telegrams. There are modules to extract time signals or time telegrams from the received signal and for marking the reference times with start and reset signals, to calculate the target time interval between the time information contained in the time signals or time telegrams, measurement modules to count the periods of the received signal in the time interval between the start and reset signals and to convert the counted periods into a reference time interval, and comparison modules to compare the target time interval with the reference time interval and to send an error signal to a Control Unit, if the deviation determined by the comparison exceeds a stipulated tolerance value. An error signal can also be produced, if the time signal or time telegram could not be used, for example because of strong noise during transmission.

In an embodiment, a previously defined device is designed as a billing unit in a charging station, a taxi meter, a wind power system, a solar system or as another unit in which time-dependent actions are conducted, in which case correctness of the available time base must be present.

In an embodiment, a previously defined device is designed as a time service calculator, time server, trusted platform module (TPM) or hardware security module (HSM).

The term "continuous carrier signal" denotes a continuous signal with a constant frequency. Usually a sinus wave is used, whose parameters amplitude, frequency and phase are used for modulation of data to be transmitted. The transmission medium can be a cable or wireless transmission channel.

The periods of the recovered continuous carrier signal, which is modulated by the time signal or time telegram, or of the transmission frequency in the moment, when the periods are counted, of the received modulated signal, are called "periods of the received signal".

The term "time signal" denotes a data structure transmitted continuously in a fixed time grid with time information contained therein. Typically the fixed time grid is uniform and the data structure is transmitted periodically as repeating. The fixed time grid permits particularly precise determination of the so-called "reference time" of the time information within the time signal. The reference time of a time signal is the time within the transmission at which the time designated with the time signal is reached. Known time signals are the wirelessly transmitted WWVB, which is broadcast with a frequency of 60 kHz, and WWV, which is broadcast on a specified frequency between 2.5 MHz and 20 MHz on a fixed time grid. One symbol of the BCD time code is transmitted each second. The reference time of this signal then lies at the end of the time signal. The publications mentioned in the Background are referred for additional details [0003].

The term "time telegram" denotes a transmitted data packet with the time information contained therein. The structure of the data packet then corresponds to a determined or determinable scheme so that the contained time information can be allocated to a specified reference time within or in the vicinity of the broadcast time of the time telegram. For example, the reference time corresponds to the time of transmission of the first or last bit in the data packet. In contrast to the previously defined time signal, transmission of the time telegram need not occur in a stipulated time grid. Time telegrams can be transmitted in a variable time grid which does not permit or only to a limited extent permits prediction of the possibility of reception on the receiver side. Consequently, in practical applications, the continuous carrier signal used for transmission of time telegrams can be also used to transmit subsequently other telegrams. Depending on the occurrence and prioritization of these other telegrams, transmission of the time telegrams can be suppressed in the sense that the time interval between consecutive time telegrams is increased. Accordingly, the possibilities for predictable reception of time data are reduced for a receiver of the time telegrams.

The term "time data" denotes the data, which contain the time information, which is received after decoding a time signal or a time telegram and indicates the actual time sent by a time service.

Operation of a technical infrastructure for transmission of time signals is referred to as "time service". Such a technical infrastructure typically includes a time normal, which produces the binding basis for the time data being broadcast. The time normal is typically equipped by an atomic clock. The technical infrastructure also includes a transmitter to broadcast a modulated signal, from which the time signals or time telegrams with the time data could be derived by an appropriate demodulation method.

The initial time information should be input to the device by a trustworthy channel or way, because the verification procedure relays on the correctness of the preceding time information. The initial time information is the preceding time information for the first received time signal or time telegram.

BRIEF DESCRIPTION OF THE DRAWINGS

Exemplary methods for verification of time information from a time signal or time telegram modulated on a continuous carrier signal and an example of a device for execution of such a method are shown in the appended drawings.

DETAILED DESCRIPTION OF ILLUSTRATIVE EMBODIMENTS

Figure 1:
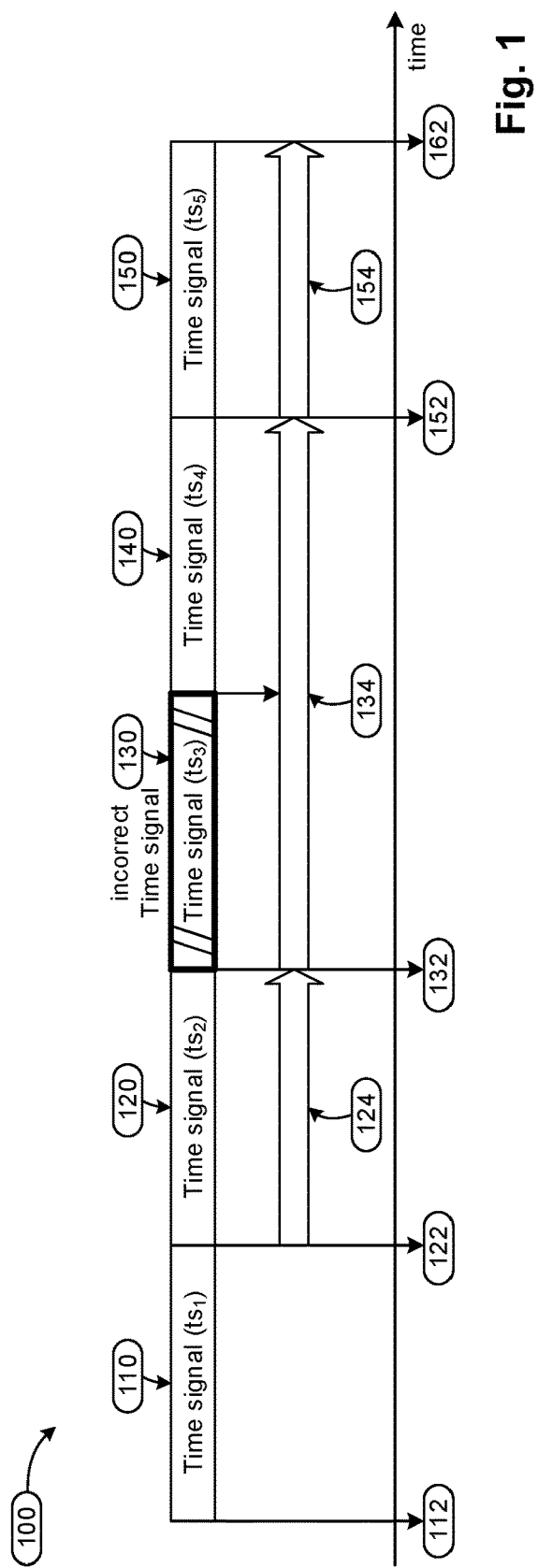
FIG. 1 shows a schematic time sequence of continuous time signals. For simplification of FIG. 1, the reference time of a time signal is marked at the end of a time signal. In practice the location of the reference time is depending on the defined structure of the time signal and the transmission system.

The schematic depiction in FIG. 1 shows a schematic time sequence 100 for reception of time signals 110, 120, 130, 140 and 150. The received signal is continuously present during undisturbed reception. Several immediately consecutive time signals 110, 120, 130, 140 and 150 are coded by modulation of the carrier signal. The time signals 110, 120, 130, 140 and 150 lie in a stipulated time grid and each contains time data, which represent time information. In addition, the time signals mark the reference time 122, 132, 152 and 162. 130 is a time signal, which is not correct or could not be demodulated or decoded correctly, for example because of transmission noise. Therefore the next available reference time beyond 132 is 152 after recognition of correct time data of the time signal 140.

The measures and devices for reception of the time signals 110, 120, 140 and 150 for extraction of the time information and for recognition of the reference times 122, 132, 152 and 162 are known (see referenced publications in the Background) and are therefore not further presented here. During reception of a time signal 110, 120, 140 and 150, time data are decoded and these can be used relative to the subsequently recognized reference time 122, 132, 152 and 162 for synchronization of a local clock of the receiver or for any other purpose.

For verification of the time information contained in a time signal after the reception of a first time signal 110 and specifically in the present case of recognition of the reference time 122 counting the periods of the received signal is started, which is stopped with reception of a second correctly received subsequent time signal 120 at the reference time 132. The next time signal with correct time data needs not directly follow the last one. This situation is shown after successful reception of time signal 120 and recognition of the reference time 132. In the case, that time signal 130 cannot be recognized correctly, no reference time is given and the periods of the recovered continuous carrier or modulated signal are counted till recognition of the reference time 152.

After completion of counting at 132, a target time interval is calculated from the time information of the first and second received time signals 110 and 120. The time interval 124 is calculated from the counted periods of the received signal with respect to the applied modulation scheme, which is referred to here as reference time interval. If the deviation determined by comparison between the target time interval and reference time interval surpasses a stipulated tolerance value, an error signal is produced. Further corresponding calculations and verifications are processed at 152 using the target time interval between 140 and 120 and the reference time interval 134, and at 162 using the target time interval between 150 and 140 and the reference time interval 154.

Figure 2:
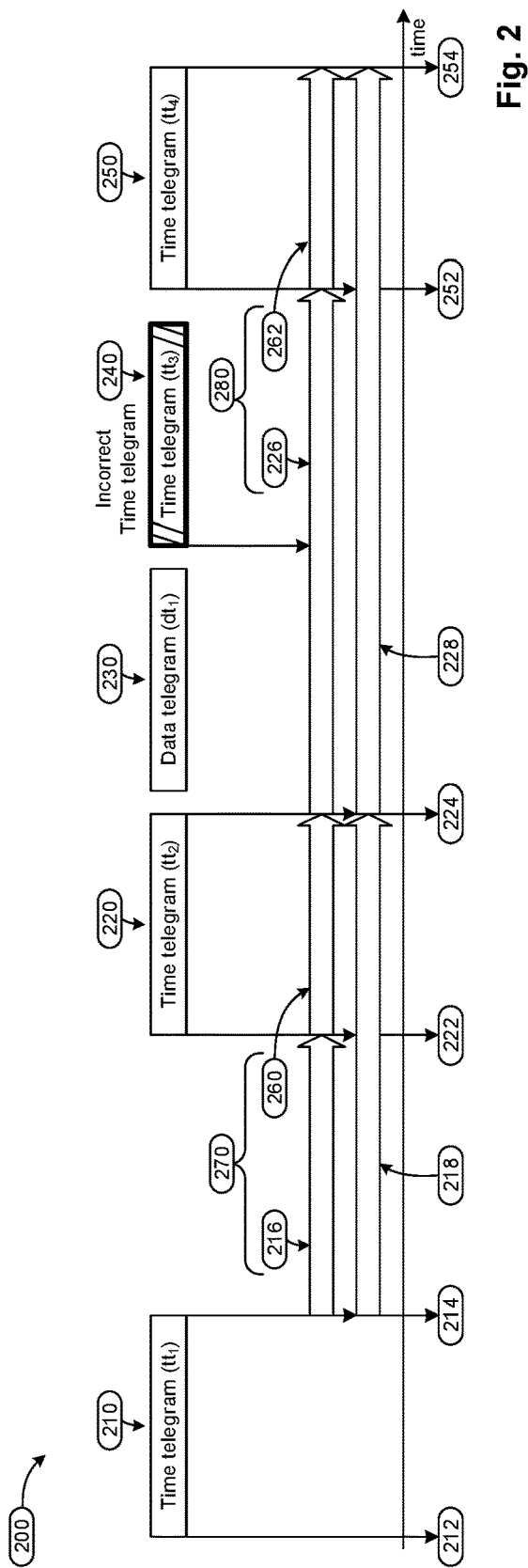
FIG. 2 shows a depiction of the time sequence of time telegrams and data telegrams in a packet oriented transmission scheme as a basis for alternative exemplary methods for time verification of time data of time telegrams methods. For simplification of FIG. 2, the reference time of a time telegram is marked at the end of a time telegram. In practice the location of the reference time is depending on the defined structure of the time telegram and the transmission system.

An exemplary packet oriented data transmission scheme 200 is shown in FIG. 2. This data transmission scheme is used for example in satellite based positioning systems like GPS, in the known ripple control and especially in radio ripple control. Since this transmission scheme largely corresponds to the well-known approaches for packet oriented transmission schemes, the subsequent presentation will be restricted to the second exemplary method for verification explained below in its essential aspects.

In the course of time, from left to right, several data packets 210, 220, 230, 240, 250 are received. In particular, these data packets are four time telegrams 210, 220, 240, 250 and a data telegram 230. The time telegram 240 is assumed to be received with errors. The times of corresponding transmission are not rigidly established but are determined on the transmitter side. However, the data packets 210, 220, 230, 240, 250 are delimited in time relative to each other during transmission by packets and in particular may not overlap in time.

Based on a received signal with the time transmission scheme according to FIG. 2, the verification of time data from time telegrams is obtained with the following measures.

For this purpose, a first time telegram 210 is initially received defining a first reference time 214. In particular, time data are gained by demodulation of the received signal.

In a first exemplary alternative the reference time interval 218 can be received by counting continuously the periods of the received signal from the reference time of $tt_1$ till the reference time of $tt_2$ e.g. from one bit position of time telegram 210 till the same bit position of time telegram 220, e.g. from the last bit of 210 till the last bit of 220 as shown in FIG. 2.

In a second exemplary alternative, the reference time interval 270 is determined by contributions of time intervals 216 and 260. The first contribution 216 is calculated via the periods of the received signal counted during the time interval 216 between the end time of $tt_1$ and 222 under respect of the applied modulation scheme.

The transmission time of the packet 220 forms the second contribution to the reference time interval 270. The transmission time 260 of the packet 220 can be calculated by different ways. If the length of the time telegram is fixed, a fixed value can be used as second contribution 260 to the reference time interval 270. Another way is to calculate the packet transmission time by the length of the telegram under consideration of the used transmission rate. Another way is to count the periods of the received signal from 222 till the end of $tt_2$ and to calculate the time interval 260 under respect of the modulation scheme.

The addition of the first contribution 216 and second contribution 260 results in the reference time interval 270.

The similar method is applied, if data telegrams or invalid time telegrams are received between two valid time telegrams, for example data telegram 230 and invalid time telegram 240 between two valid time telegrams 220 and 250. A first contribution 226 to the reference time interval 280 is formed by counting the periods of the received signal from the end time of $tt_2$ to the start of $tt_4$ marked by 252. The second contribution 262 to the reference time interval 280 is calculated as described in [0048].

The addition of the first contribution 226 and second contribution 262 results in the reference time interval 280.

The reference time interval 228 can be received by counting the periods of the received signal between the reference times of two valid time telegrams 220 and 250.

After completion of counting the periods at 224 the reference time interval is computed with respect to the applied modulation scheme, and the target time interval is calculated from the time information of the first and second received time telegrams 210 and 220. If the deviation determined by comparison between the target time interval and reference time interval 218 or 270 surpasses a stipulated tolerance value, an error signal is produced. Further corresponding calculations and verifications are processed at 254 using the target time interval between time data of 220 and 250 and the reference time interval 228 or 280.

Figure 3:
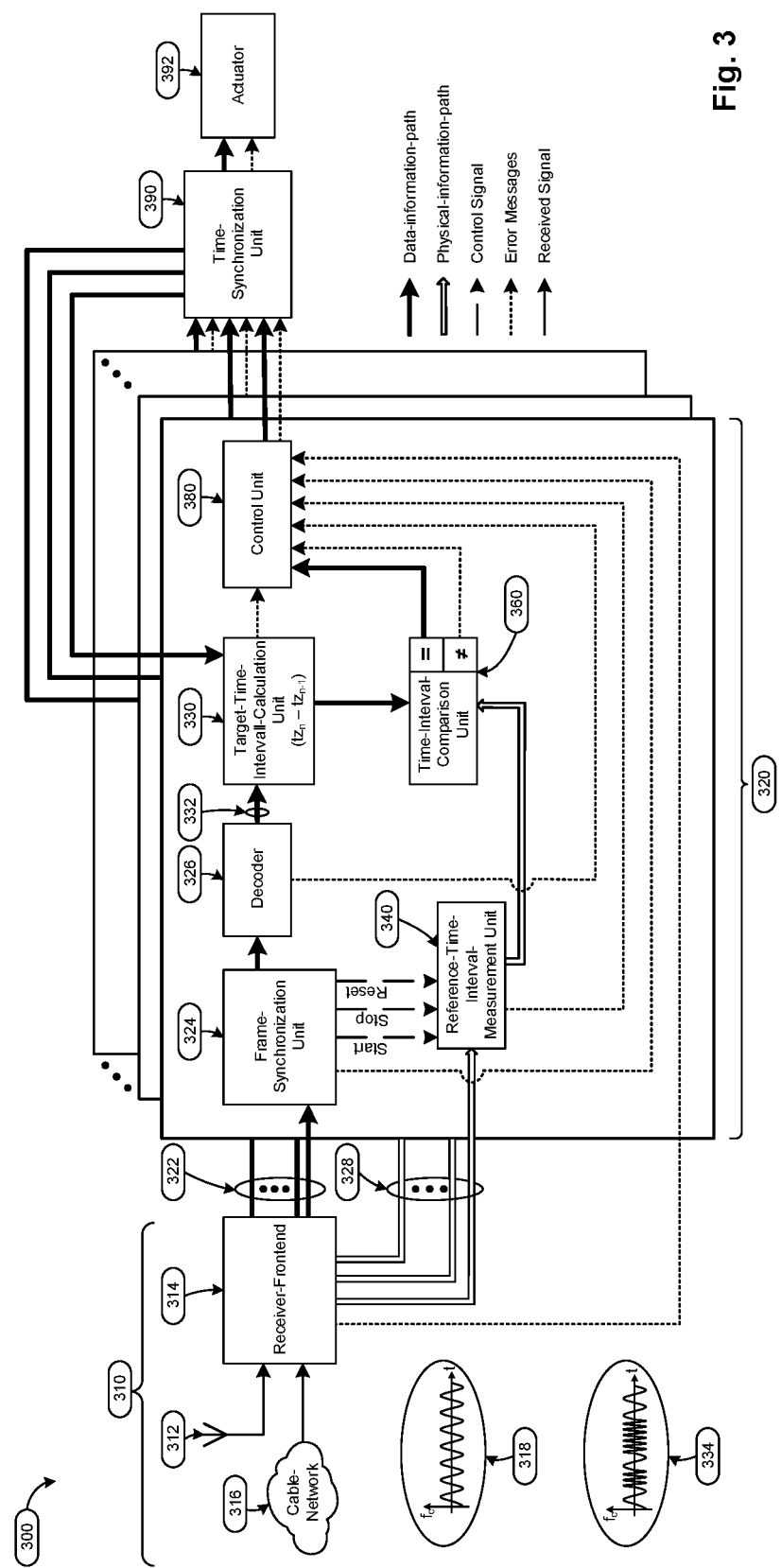
FIG. 3 shows a block diagram of an exemplary device for performance of single or multiple received carriers modulated by time signals or time telegrams.

All exemplary methods for verification of time information from time signals and time telegrams presented above can be conducted with the exemplary device 300 for delivering a remote synchronized verified time base according to FIG. 3. This comprises the assemblies or functional units explained below along the processing path, i.e. in the direction of signal and data flow.

At the beginning of the processing path, receiving modules 310 are provided to receive the signal with modulated data structures. In particular, the receiving module 310 includes an antenna loop 312 adapted to the frequency range of the wireless signal or an interface 316 to a cable network, which can be telecommunication network, an electric energy network with powerline communication or ripple control. The output of 312, resp. 316 is connected to the input of a Receiver-Frontend 314.

The Receiver-Frontend 314 contains components, which deliver two types of output. As examples, two types of embodiments of the 314 will be described in the following sections. In both embodiments the Receiver Frontend 314 sends an error signal to the Control Unit 380, if an error is recognized by 314. This error signal can contain additional information about the reason for the error signal.

In one embodiment of 314 one output are the demodulated data 322, which are contained in the received modulated signal, and another output 328 is the recovered carrier signal 318, which was used by the transmitter to modulate the data. The output signal 328 can also be output as a digital signal after analog/digital conversion.

In another embodiment of 314 one output are the demodulated data 322, which are contained in the received modulated signal, and another output 328 is the received modulated signal, depicted as an example in 334 for the case of frequency modulation. The output signal 328 can also be output as a digital signal after analog/digital conversion.

The signal received by 314 can contain more than one stream of modulated time signals or modulated telegrams.

Different technical scenarios for multiple time signals and multiple time telegrams at the same time are possible: at first, different modulation schemes of only one carrier frequency can be used to code different time signals and time telegrams or different representations of them. In this case each demodulated time signal or time telegram is output separately together with the recovered carrier signal 318 or the received modulated signal 334. At second, different transmitters of time signals or time telegrams use the same frequency and code division multiplexing techniques (CDMA). The spread bits of time signals or time telegrams are modulated onto the same carrier frequency. In this case the Receiver-Frontend 314 receives a sum signal of all transmitted signals. The frequencies of all transmitted signals, which use the same appointed frequency, can be slightly different and the phases of the carrier signal have not to be synchronous. In one embodiment the Receiver-Frontend 314 recovers and delivers for each filtered stream of time signals or time telegrams the carrier signal 318, which was used by the transmitter for the modulation of the corresponding data, as output 328. Carrier frequency 1 is the carrier frequency used for modulation of $data_1$ 322, carrier frequency 2 is the carrier frequency used for modulation of $data_2$ 322, and so on. In another embodiment the modulated signals 334 are the output 328. At third, multiple sources of time signals and time telegrams use different carrier frequencies, where the ranges of the used frequency bands do not overlap. This case can be handled by multiple receivers 314, where each receiver filters one of the used frequency bands.

To process the tasks of the Receiver-Frontend 314, it contains filters, demodulators, amplifiers, modules for the recovery of the modulated carriers, etc., as they are known from standard communication technology.

The block 320 depicts the processing of one of the data streams 322 with the corresponding signal 328. If the output of 314 contains multiple data streams, 320 will be present in a corresponding number of implementations.

The data output 322 of 314 is the input for a Frame-Synchronization Unit 324. In the case of a received periodic time signal this unit searches for the beginning (first symbol) and end (last symbol) and recognizes the content. The received time signal is withdrawn, if it is not a valid time signal. It is assumed as an example, that the reference time interval between two valid time signals is calculated as depicted by 124, 134 or 154 in FIG. 1. In case of a received time telegram 324 recognizes the start and the end of a packet, the structure of the telegram inside the packet as well as the content and verifies the checksum, if a checksum exists. The telegram is withdrawn, if it is not a valid time telegram. In case of received time telegrams it is assumed as an example, that the reference time interval between two valid time telegrams is calculated as depicted by 218 and 228 in FIG. 2. The recognition of the reference time of a valid time signal or valid time telegram will output a reset signal to the Reference-Time-Interval-Measurement Unit 340, the recognition of the end of the next valid periodic time signal or next valid time telegram will cause the next reset signal. The type of the output 328 determines, how the periods of the received signal of 328 are counted. In case, that 328 consists of the recovered carrier as depicted in 318, or the modulated signal as depicted in 334 is modulated by amplitude shift keying, the periods of the received signal 328 are counted from one reference time to the next reference time. In the case, that frequency or phase shift keying or combinations of modulation techniques are used for forming 334, the periods of the received signal have to be counted separately for data bit "1" and data bit "0", resp. for different symbols, if higher order modulation schemes are used. One separate counter is assigned to each possible state of modulation, for example for each frequency or phase. Each counter counts the periods of the received signal during the assigned state from a start signal to a stop signal sent from 324. The scheme described here as an example is the case of frequency modulation with two frequencies. It can be extended easily, if more than two states are used. If the first bit of a time signal is "0", 324 sends a start Counter 0 signal to 340, if the first bit is "1", 324 sends a Start Counter 1 signal to 340. At the end of each bit run, which is a sequence of bits "1" or bits "0", 324 sends a Stop counter 1 signal, when a bit run of "1" is ending or a Stop Counter 0 signal, when a bit run of "0" is ending. The stop Counter signal can be omitted, if the Start Counter signal implicitly stops the preceding counter. Only one counter is active at a moment.

In the case, that 314 outputs 328 as modulated signal, which is shown exemplary in 334, the Receiver-Frontend 314 and the Frame-Synchronization Unit provide synchronization of the start, stop and reset signals from 324 to 340 with the changes of states of the modulated signal 334 as described in [0063]. The exactness of synchronization impacts the exactness of the verification of time information.

The Frame-Synchronization Unit can recognize different irregular situations, which cause an error signal to the Control Unit 380, which can contain additional information about the reason of the error. For example, such an irregular situation can be too many subsequent wrong time signals or time telegrams or loss of synchronization longer than a predefined time.

The Reference-Time-Interval-Measurement Unit 340 counts the periods of the recovered carrier 318 or the modulated signal 334. The number of counted periods divided by the frequency under respect of the modulation scheme results in the past time from beginning of counting till the end of counting. The counting is controlled by the Frame-Synchronization Unit 324. The Reference-Time-Interval-Measurement Unit 340 has one or more counters, depending on the type of 328 and the modulation scheme, see [0063]. When 340 receives a reset signal from 324, each counter value is divided by the frequency, which was used in the state assigned to the counter, and all counter values are set to zero. Each division results in the time interval, which past during counting. The sum of all past time intervals is the reference time interval from the last valid time signal or time telegram till the actual received time signal or time telegram. The reference time interval is output to 360. If 340 receives a start counter signal for one of the counters, this counter continues to count the periods of the received signal in the state, to which the counter is assigned. If 340 receives a stop counter signal for one of the counters, this counter is stopped at the actual counter value.

In one embodiment the output 328 is rectified by the Receiver-Frontend using half-wave or full-wave rectification. Depending on the type of rectifying the counter values have to be adjusted, e.g. multiplied by 2, when full-wave rectification is applied.

There is a Decoder 326 behind the Frame-Synchronization Unit 324, which receives structured time signals or time telegrams. The Decoder decodes the string of bits, which contain the time information, and outputs time data 332. The time data contain the actual time information. If the Decoder recognizes irregular situations, an error signal is output to the Control Unit 380. This error signal can contain additional information about the reason for the error signal.

The Target-Time-Interval-Calculation Unit 330 calculates the difference of the time information of the latest received valid time signal or time telegram and the time information of the preceding valid time signal or time telegram, which results in the target time interval. Instead of the time information of the preceding valid time signal or time telegram the preceding verified time information provided by the Time-Synchronization Unit can be used to calculate the difference. The output from 330 to 360 consists of the target time interval and the time information of the latest received time signal or time telegram. If the Target-Time-Interval-Calculation Unit recognizes irregular situations, an error signal is output to the Control Unit 380 This error signal can contain additional information about the reason for the error signal.

The Time-Interval-Comparison Unit 360 receives the target time interval and the time data of the latest received valid time signal or time telegram from the Target-Time-Interval-Calculation Unit 330 and the reference time interval from the Reference-Time-Interval-Measurement Unit 340. The Time-Interval-Comparison Unit compares both time intervals. If the difference of both time intervals is smaller than a predefined threshold, the time information is accepted and the time information is given as trustworthy time information to the Control Unit 380. In the other case an error control signal is given to the Control Unit 380. This control signal may contain additional information.

The Control Unit 380 receives the current time information from the Time-Interval-Comparison Unit 360 and forwards it to the Time-Synchronization Unit 390. It also receives error signals from the modules 314, 324, 340, 326, 330 and 360 in the case of an occurred error. If an error is reported an error message is output to the Time-Synchronization Unit with optional additional information.

The Time-Synchronization Unit 390 is mainly used in the case, that multiple modules 320 are present, because multiple multiplexed time signals or time telegrams are received by 314. The input of the Time-Synchronization Unit is the trustworthy time information from multiple modules 320. The different time information can be used to for calculation of the most correct time or for other purposes. The result of these calculations is output to the actuator and/or the Target-Time-Interval-Calculation Unit. In case, that no correct actual time is present, the actuator is informed about missing a correct time or errors, till an actual correct time is present again.

In the case, that only one module 320 is present, the Time-Synchronization Unit forwards the input from the Control Unit 380 or can be omitted.

The device 300 just explained can advantageously be used to hamper manipulation of time data received via the time telegrams. It therefore works as part of a billing unit for time-based billing, for example, in a charging station, a taximeter, a wind power unit, a solar unit or for units in which time-dependent actions are conducted in which correctness of the available time base must be present.

The device 300 just explained can also be expediently used as part of a time service calculator, time server, trusted platform module (TPM) or hardware security module (HSM).

LIST OF REFERENCE NUMBERS

100 Time sequence of continuous time signals
110 Time signal $ts_1$
112 Start time of $ts_1$
120 Time signal $ts_2$
122 Reference time of $ts_1$
124 Reference time interval between $ts_2$ and $ts_1$
130 Incorrect Time signal $ts_3$
132 Reference time of $ts_2$
134 Reference time interval between $ts_4$ and $ts_2$
140 Time signal $ts_4$
150 Time signal $ts_5$
152 Reference time of $ts_4$
154 Reference time interval between $ts_5$ and $ts_4$
162 Reference time of $ts_5$
200 Time sequence of time telegrams
210 Time telegram $tt_1$
212 Start time of time telegram $tt_1$
214 Reference time of time telegram $tt_1$
216 Time interval between start time of $tt_2$ and end time of $tt_1$
218 Reference time interval between $tt_2$ and $tt_1$
220 Time telegram $tt_2$
222 Start time of time telegram $tt_2$
224 Reference time of time telegram $tt_2$
226 Time interval between start time of $tt_4$ and end time of $tt_2$
228 Reference time interval between $tt_4$ and $tt_2$
230 Data telegram $dt_1$
240 Incorrect time telegram $tt_3$
250 Time telegram $tt_4$
252 Start time of time telegram $tt_4$
254 Reference time of time telegram $tt_4$
260 Packet transmission time of time telegram $tt_2$
262 Packet transmission time of time telegram $tt_4$
270 Reference time interval (sum of 216 and 260) between $tt_2$ and $tt_1$
280 Reference time interval (sum of 226 and 262) between $tt_4$ and $tt_2$
300 Device for delivering a remotely synchronized verified time base
310 Receiver
312 Antenna
314 Receiver-Frontend
316 Cable Network
318 Recovered carrier signal
320 Processing module
322 $Data_i$, i=1, . . . n
324 Frame-Synchronization Unit
326 Decoder
328 Recovered carrier signal (see 318) or modulated signal (see 334)
330 Target-Time-Interval-Calculation Unit
332 Time data
334 Modulated signal
340 Reference-Time-Interval-Measurement Unit
360 Time-Interval-Comparison Unit
380 Control Unit
390 Time-Synchronization Unit
392 Actuator

What is claimed is:

1. A method for verification of time information from time data modulated on one or more continuous carrier signals, comprising:
receiving a signal;
receiving, at a first reference time, a first time signal or a first time telegram within the received signal;
receiving, at a second reference time which follows the first reference time in time, a second time signal or a second time telegram which follows the first time signal or the first time telegram in time within the received signal;
calculating a target time interval between the first time signal or the first time telegram and the second time signal or the second time telegram from the time data contained in the received first time signal or the received first time telegram and the received second time signal or the second time telegram, or from received preceding verified time information and the second time signal or the second time telegram;

determining a reference time interval by counting of periods of the received signal within an actual time interval between the first reference time and the second reference time;

performing a comparison of the target time interval with the reference time interval; and outputting an error signal, if a deviation determined by the comparison surpasses a stipulated tolerance value.

2. The method according to claim 1, wherein, for verification of time information from the target time interval determined from the first time signal or the first time telegram and the second time signal or the second time telegram transmitted in a fixed time grid used for determination of the reference time interval, the method further comprises:

counting periods of the received signal in the actual time interval between the first reference time and the second reference time determined by the first received time signal or the first received time telegram and the second received time signal or the second received time telegram respectively;

determining a deviation between the target time interval and the reference time interval; and verifying the time information when the deviation is less than or equal to the stipulated tolerance value; and generating the error signal when the deviation is greater than the tolerance value.

3. The method according to claim 1, wherein the method further comprises:

the time information is comprised in time telegrams transmitted in packet-oriented mode from a loose time grid; and for determination of the reference time interval, the method includes counting periods of the received signal in the actual time interval between the first reference time and the second reference time determined by the first received time signal or the first time telegram and the second received time signal or the second received time telegram; and for determination of the reference time interval, the method includes counting periods of the received signal in the time interval between an end of the first received time signal or the first received time telegram and a start of the second received time signal or the second time telegram; and adding a packet transmission time to the already counted periods.

4. The method according to claim 3, further comprising determining the packet transmission time by counting the periods of the first received time signal or the first time telegram during transmission of a packet, which contains the time telegram.

5. The method according to claim 3, wherein a predetermined value is added as the packet transmission time.

6. The method according to claim 3, further comprising:

counting the periods for each of a plurality of modulated frequencies of the one or more continuous carrier signals using a separate counter for each; and weighting the counted periods with period times of the plurality of modulated frequencies of the one or more continuous carrier signals.

7. The method according to claim 3, further comprising establishing variation of a period time of a received frequency-modulated signal of the one or more continuous carrier signals according to data derived from the received frequency-modulated signal by demodulation.

8. The method according to claim 1, further comprising establishing counters for counting the periods during the different states of the applied modulation scheme used for modulation of time data on one or more continuous carriers.

9. A device for providing a remotely synchronized verified time base, the device comprising:

one or more Receiver-Frontends configured to receive a signal including time signals or time telegrams modulated on one or more continuous carrier signals;

one or more Frame-Synchronization Units configured to extract time signals or time telegrams from the received signal and to mark a reference time interval;

one or more Decoders configured to decode time data from the extracted time signal or the extracted time telegram;

one or more Reference-Time-Interval-Measurement Units configured to count periods of the received signal in an actual time interval between a first reference time determined by a first time signal or a first time telegram and a second reference time determined by a second time signal or a second time telegram, the counting of periods of the received signal is controlled by marks of the one or more Frame-Synchronization Units, the one or more Reference-Time-Interval-Measurement Units including a plurality of counters, the one or more Reference-Time-Interval-Measurement Units configured to use different counters of the plurality of counters for different states of a modulation scheme, the counted periods are used to calculate the reference time interval;

one or more Target-Time-Interval-Calculation Units configured to calculate a target time interval lying between time information from time data contained in the received time signals or the received time telegrams that are received correctly;

one or more Time-Interval-Comparison Units configured to perform a comparison of the target time interval with the reference time interval and to send an error signal, if a deviation determined by the comparison exceeds a stipulated tolerance value, and to produce verified time information when the deviation is less than or equal to the stipulated tolerance value;

one or more Control Units configured to forward the verified time information and process error handling when the deviation exceeds the stipulated tolerance value; and one Time-Synchronization Unit configured to process verified time information output from the one or more control units for evaluation and optimization; the one time-synchronization unit including an output that is the verified time information delivered to application processes and to the Target-Time-Interval-Calculation Unit.

10. The device according to claim 9, wherein the one or more Receiver-Frontends are designed as tuned radio frequency receivers.

11. The device according to claim 9, wherein the counted periods are periods of a rectified received signal.

12. The device according to claim 9, wherein the device is designed as a billing unit in a charging station, a taximeter, a wind power unit, solar unit or as another unit in which time-dependent actions are conducted and in which correctness of an available time base must be present.

13. The device according to claim 9, wherein the device is designed as a time service calculator, time server, trusted platform module or hardware security module.

14. An electronic control system configured to output a verified actual time, the electronic control system comprising:
- a Receiver-Frontend Unit configured to receive a sequence of time signals or time telegrams modulated on a continuous carrier signal, the Receiver-Frontend Unit including a first output for outputting a data sequence, each data sequence containing a demodulated time signal of the sequence of time signals or a demodulated time telegram of the time telegrams and including a second output for outputting the received signal that includes data that is used to count periods of the received signal, the second output can be given in an analog or digital representation;
- a Frame-Synchronization Unit coupled to the first output, which extracts the demodulated time signal or the demodulated time telegram from the first output of the Receiver-Frontend Unit and determines a reference time of the time signal or the time telegram;
- a Reference-Time-Interval-Measurement Unit coupled to the second output of the Receiver-Frontend Unit, wherein the Frame-Synchronization Unit is coupled to a control input of the Reference-Time-Interval-Measurement Unit, which generates a start control signal upon recognition of a first reference time of a first time signal or a first time telegram in response to which the Reference-Time-Interval Unit starts counting the periods of the received signal, the Frame-Synchronization Unit configured to apply a stop and reset signal upon recognition of a second reference time of a next succeeding valid time signal or a next succeeding valid time telegram in response to which the Reference-Time-Interval-Measurement Unit stops counting the periods of the second output of the Receiver-Frontend Unit, the Reference-Time-Interval-Measurement Unit configured to calculate an actual reference time interval using the counted periods from one or more counters controlled by control signals from the Frame-Synchronization Unit, the counted periods are weighted by a period time of the periods counted by a respective one of the one or more counters, the Reference-Time-Interval-Measurement Unit configured to provide the actual reference time interval signal being representative of the calculated actual reference time interval;
- a decoder configured to decode the demodulated time signal or the demodulated time telegram to extract time information;
- a Target-Time-Interval-Calculation Unit configured to perform a calculation of a target time interval between first time information from the time information received with the first time signal or the first time telegram and second time information from the time information received with a second time signal or a second time telegram which is the next succeeding valid time signal or a next succeeding valid time telegram, the Target-Time-Interval-Calculation Unit configured to provide a target time interval signal representative of the calculated target time interval to the Time-Interval Comparison Unit and to provide the time information to the Time-Interval Comparison unit representative of the second time information to be used as time information of the first time signal or first time telegram; and
- a Time-Interval-Comparison Unit configured to receive the reference time interval signal from the Reference-Time-Interval-Measurement Unit and the target time interval signal from the Target-Time-Interval-Calculation Unit, the Time-Interval-Comparison Unit configured to calculate a difference between the time reference interval and the target time interval and to compare the difference to a threshold value, if the difference is smaller than the threshold value, the time information received from the Target-Time-Interval Calculation Unit is outputted to a Control Unit, and if the difference is greater than or equal to the threshold, an error signal is output to the Control Unit; and
- the Control Unit configured to process and to forward the output of the Time-Interval-Comparison Unit and error handling, the Control Unit is configured to receive errors generated from all other units, the Control Unit configured to monitor a sequence of confidence values to detect trials of clock manipulation.

15. The electronic control system of claim 14, wherein the received signal is a modulated signal or a plurality of modulated signals modulated by frequency, amplitude, phase, or a combination thereof, and/or multiplexed by spreading techniques.

16. The electronic control system of claim 14, wherein the received signal contains the sequence of time signals or the time telegrams, the received signal including at least one of a space-based global positioning signal (GPS), a time signal radio station based signal, a radio ripple control based signal, a wired ripple control based signal, and a terrestrially-based enhanced long-range navigation signal.

17. The electronic control system of claim 14, being adapted for parallel processing of a plurality of the sequence of time signals or the time telegrams modulated on the carrier signals received concurrently to obtain a set of target-time intervals, reference-time intervals and respective verified time information and confidence signals, and further comprising a Time-Synchronization Unit for receiving the set of verified time information and confidence signals for processing in order to generate a resultant verified time information that is used for synchronizing the time base.

18. The electronic control system of claim 17, the Time-Synchronization Unit being configured to calculate a resulting value for the set of verified time information for which a confidence signal is present to provide the verified time information which is output to application processes and fed back to the Target-Time-Interval-Calculation Unit.

19. The electronic control system of claim 14, being coupled to one of a billing unit in a charging station, a taximeter, a wind power unit, a solar unit, and an actuator.

20. The electronic control system of claim 14, comprising a hybrid analogue-digital integrated circuit chip implementing the Receiver-Frontend, the Frame-Synchronization Unit, the Reference-Time-Interval-Measurement Unit, the Decoder, the Target-Time-Interval-Calculation Unit the Time-Interval-Comparison Unit and the Control Unit.

* * * * *